United States Patent [19]

Grimaldi et al.

[11] Patent Number: 5,194,941
[45] Date of Patent: Mar. 16, 1993

[54] SELF-ADAPTING METHOD AND DEVICE FOR THE INLAYING OF COLOR VIDEO IMAGES

[75] Inventors: Jean-Luc Grimaldi, Ermont; Sylvie Galichet, Compiegne, both of France

[73] Assignee: Thomson Video Equipment, Cergy Saint Christophe, France

[21] Appl. No.: 700,200
[22] PCT Filed: Sep. 28, 1990
[86] PCT No.: PCT/FR90/00697
§ 371 Date: Jun. 6, 1991
§ 102(e) Date: Jun. 6, 1991
[87] PCT Pub. No.: WO91/05443
PCT Pub. Date: Apr. 18, 1991

[30] Foreign Application Priority Data

Oct. 6, 1989 [FR] France .................. 89 13085

[51] Int. Cl.5 .......................................... H04N 9/75
[52] U.S. Cl. ..................................................... 358/22
[58] Field of Search .......... 358/22 CK, 22 PIP, 22 C, 358/22, 182, 183, 181; 382/16, 22; 395/128, 129

[56] References Cited

U.S. PATENT DOCUMENTS

| | | | |
|---|---|---|---|
| 4,488,169 | 12/1984 | Yamamoto | 358/22 CK |
| 4,533,937 | 8/1985 | Yamamoto et al. | 358/22 CK |
| 4,573,172 | 2/1986 | Grimaldi | 375/116 |
| 4,580,158 | 4/1986 | Macheboeuf | 358/22 |
| 4,589,013 | 5/1986 | Vlahos et al. | 358/22 |
| 4,646,154 | 2/1987 | Shinohara et al. | 358/183 |
| 4,794,627 | 12/1988 | Grimaldi | 375/114 |
| 4,868,663 | 9/1989 | Grimaldi et al. | 358/209 |
| 5,027,287 | 6/1991 | Artigalas et al. | 395/133 |
| 5,043,800 | 8/1991 | Snashall et al. | 358/22 |

FOREIGN PATENT DOCUMENTS 0024973 3/1981 European Pat. Off. .
0070174 1/1983 European Pat. Off. .
0074824 3/1983 European Pat. Off. .
59-212090 11/1984 Japan .

OTHER PUBLICATIONS

Fernseh-und Kino-Technik, vol. 43, No. 6, Jun. 1989, (Heidelberg, DE), H. Schönfelder: "Digitale HDTV-Bildmischung", pp. 301-307.
Fernseh-und Kino-Technik, vol. 42, No. 6, Jun. 1988, (Heidelberg, DE), U. Riemann et al.: "Methoden der Signalverarbeitung in eimen digitalen HDTV-Chromakey-Mischer", pp. 259-264.

Primary Examiner—James J. Groody
Assistant Examiner—Safet Metjahic
Attorney, Agent, or Firm—Oblon, Spivak, McClelland, Maier & Neustadt

[57] ABSTRACT

The method for the inlaying of color video images consists on the one hand in generating a switching signal, or dividing key, applying a gain on the image points belonging to the contour of the subject to be inlaid, in proportion to the distance value (DIST) between the color of the point and that of the back-ground, and on the other hand in carrying out a mixing of the source image and a new background image which is a function of the value of the dividing key signal at the point in question and such that the values of the source signal and of the new background signal are fixed at constants over the width of the contour.

11 Claims, 5 Drawing Sheets

SELF-ADAPTING METHOD AND DEVICE FOR THE INLAYING OF COLOR VIDEO IMAGES

BACKGROUND OF THE INVENTION

1. Field of the Invention

The present invention relates to a self-adapting method and device for the inlaying of colour video images.

2. Description of the Related Art

The inlaying of colour video images consists in extracting, from a source image, a subject, such as a person or an object, moving in front of a uniform colour background in order to place it in front of a new background.

It is known to define the uniform colour background in the plane $C_R C_B$ (with $C_R = R - Y$, $C_B = B - Y$, where B, R, Y represent the blue colour signal, the red colour signal and the luminance respectively) by a closed area constituted by a quadrilateral. During the analysis of the source image, line by line and point by point, a point is considered as belonging to the background if its components $C_R$ and $C_B$ are inside the quadrilateral; it is considered as belonging to the section to be inlaid in the opposite case. Thus, with each line of the source image there corresponds a "key" or switching signal which, for example, has the value 1 for the part to be inlaid and the value 0 for the background, or vice-versa. However, this "key" signal does not allow a realistic rendering of the inlaid image, as the background/subject transitions are very sharp and the contours of the inlaid subject are jagged. An improvement in the rendering of the inlaid image is obtained by smoothing the background/subject transition in order to mask the jagged contours by introducing a gain function in the dividing key signal. But in this case, it is not possible to reproduce fine details, nor transparency, nor shadows, and an edge of the same colour as that of the background (generally blue) is apparent on the contour of the subject.

Another method of inlaying images is disclosed in the French patent No. 79 20820 lodged in the name of the Applicant. It consists in carrying out a linear division of the subject to be inlaid using a channel with a high fixed gain allowing the provision of a clean division for the sections of the image having no colorimetric ambiguity, and a variable gain channel allowing both the restoration of a transparency effect and the creation of a fade following the fine details around the subject. The shadow effect is obtained by detecting the low luminance levels and by causing the corresponding attenuation of the new background. However, although the shadow effect is well rendered, the fine details are attenuated and the transparency exhibits a colouring of the former background. Furthermore, for slow transitions, the presence of an edge of the same colour as the background, that is to say bluish, is still present.

Another method of inlaying images, in principle different from that of linear mixers, allows the inlaying of a red, green, blue (R, G, B) source image for a subject moving in front of a very pure blue, green (and possibly red) background. The method consists firstly in eliminating the background colour in the source image by subtraction, allowing the subject to remain as though it were placed in front of a black background. The new background is then introduced into the source image, in the zone previously occupied by the coloured background, in proportion to the luminosity and the visibility of the latter. The transparencies or semi-transparencies such as glass, smoke or fog, are therefore entirely retained. As the source image is never switched, the fine details are also fully reproduced in the inlaid image. A blue (green or red respectively) locking module allows the elimination of reflections of the coloured background on the subject in the inlaid image. Besides the fact that this method necessitates a very large number of adjustments in order to obtain a quality inlaid image, a uniform and pure background is necessary. Any non-uniformity of the background is reproduced in the inlaid image thus polluting the new background. Although it is possible to avoid this pollution of the new background by using a continuous and instantaneous zeroing of the coloured background of the source image, it is then no longer possible to reproduce transparency and shadow. Furthermore, the elimination of reflections of the background on the subject gives rise, depending on the colour of the background used, to degradations in certain colours (for example magenta is the background is blue, yellow and flesh if the background is green).

SUMMARY OF THE INVENTION

The subject of the present invention is a method for the inlaying of colour video images allowing the avoiding, or at least the reduction, of these disadvantages without necessitating a high number of adjustments. This is achieved in part by working on the contours of the subject to be inlaid, by carrying out a dynamic monitoring thereof allowing the obtaining of a dividing gain dependent exclusively on the background/subject transition in question; this allows an automatic adjustment of the gain which differs according to whether the background/subject transition is wide or narrow and contributes to the elimination of the fringe of background colour (blue for a blue background) around the subject. Furthermore, the mixing between the subject and the new background, applied according to the dividing key obtained, even though linear in principle, no longer takes into account the values of points belonging to the transition but constant values of the subject and of the new background determined at the start and end of transition. The linear mixing between subject and new background therefore no longer makes use of values of the source image containing blue arising from the coloured background and therefore also contributes to the elimination of the blue edge around the inlaid subject. Finally, the fine details, shadows and transparencies are detected in the source luminance image and reinjected in the inlaid image in proportion to their luminance level according to a linear method with two thresholds, a low threshold allowing avoidance of reinjection of the noise of the coloured background, a high threshold allowing the determination of the rates of details, shadows and transparencies of the source image to be transferred into the inlaid image. Different adjustments are possible for the sections which are darker than the background and for the sections which are lighter. Finally, a desaturation of the new background is carried out according to the same principle in those places where elements have been inlaid possibly with a capability of recolouring the latter.

According to the invention, the method for the inlaying of colour video images, consisting in the generation of a switching signal, or dividing key signal, to which a gain is applied in order to extract from a source image a subject placed in front of a uniform colour background and in carrying out a mixing of the source image and a new background image, comprising the steps of detecting background/subject and subject/background transitions (T) dynamically in the source image according to the evolution of a distance value (DIST) between the colour of the points of the source image and that of the background and defining a contour of the subject of variable width depending on characteristics of the transition, applying the gain only to points of the source image defined as belonging to the contour of the subject, and in proportion to the distance value (DIST) between a selected point belonging to the contour and another point belonging to the background.

The subject of the invention is also a device for the implementation of this method.

Other characteristics and advantages of the invention will appear clearly in the following description given by way of non-limitative example with reference to the appended figures which show:

DETAILED DESCRIPTION OF THE PREFERRED EMBODIMENTS

The source video signal containing the subject to be inlaid placed in front of a uniform coloured background, for example blue, is composed of a luminance signal Y, a red colour difference signal, $C_R$, and a blue colour difference signal, $C_B$, such that $C_R = R - Y$ and $C_B = B - Y$. These signals Y, $C_R$, $C_B$ are sampled and digitised. The sampling of the signals can be carried out, for example, at frequencies corresponding to the international standard, that is 13.5 MHz for the luminance signal, which corresponds to 720 points per line, and 6.75 MHz for each colour difference signal, which corresponds to 360 points per line.

Similarly, the encoding for digitising the signals can be, for example, chosen according to the international standard, that is to say an encoding using eight bits per sample for each of the luminance signals Y and colour difference signals $C_R$ and $C_B$. The eight bit encoding distinguishes $2^8 = 256$ levels distributed over the maximum amplitude of variation of the three encoded components Y, $C_R$, $C_B$.

Figure 1:
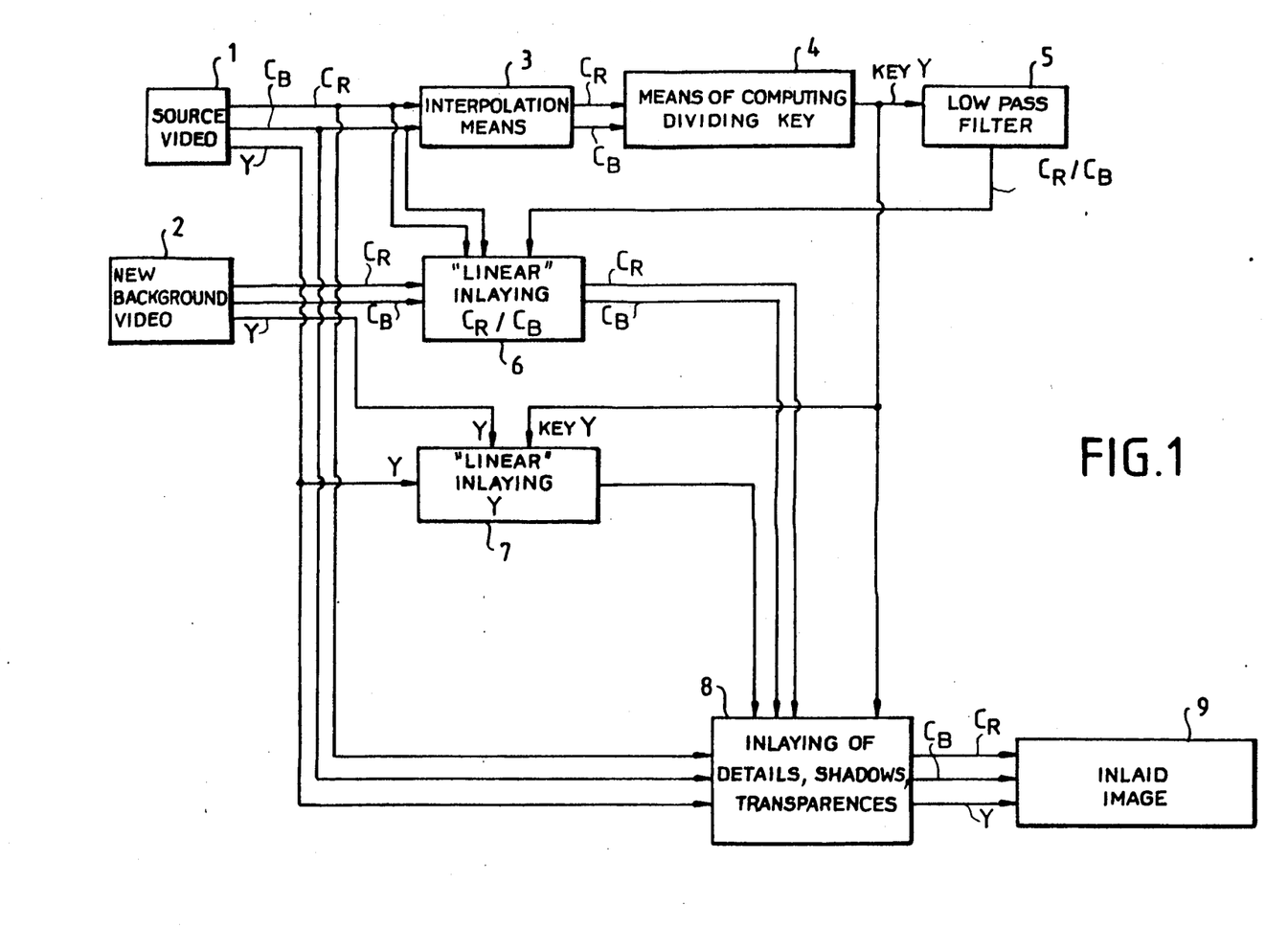
FIG. 1, a block diagram of the device for implementing the method according to the invention, FIG. 2, a block diagram for the obtaining of the dividing key signal according to the invention, FIG. 3, an example of a binary dividing key signal, FIG. 4, an example of a graph of the distances in the vicinity of a transition T, FIG. 5, an example of a contour of variable width, according to the invention, FIG. 6, an illustration of the reduction of the interval of the distances on a contour according to the invention, FIG. 7, an example of a flowchart allowing the computation of a dividing key with gain according to the invention, FIG. 8, an example of the inlaying of luminance details according to the invention, FIG. 9, an example of the inlaying of chrominance details according to the invention.

FIG. 1 is a block diagram of the device for implementing the method according to the invention. The implementing of the method necessitates means 3 of interpolation of the colour difference signals $C_R$, $C_B$ coming from the source video image 1 in order to obtain an identical number of samples for the colour difference signals and the luminance signal, means 4 of computing the dividing key allowing the inlaying of the subject in luminance from the interpolated colour difference signals, means 5 forming a low pass filter receiving, on input, the luminance dividing key signal Y and supplying, on output, the dividing key signal $C_R/C_B$ allowing the inlaying of the colour difference signals, means 6 receiving, on input, the source colour difference signals $C_R$, $C_B$ coming from the source video image 1 and background colour difference signals $C_R$, $C_B$ coming from the new background video image 2, as well as the dividing key signal $C_R/C_B$ in order to carry out the inlaying of the colour difference signals, means 7 receiving on input the Y source and Y background luminance signals as well as the dividing key signal Y in order to carry out the inlaying of the luminance signal, and means 8 receiving on input the luminance signals Y and colour difference signals $C_R$, $C_B$ of the source video signal and of the video signal after inlaying as well as the dividing key signal Y, allowing the carrying out of the inlaying of details, shadows and transparencies and the obtaining of the final inlaid image 9.

Figure 2:
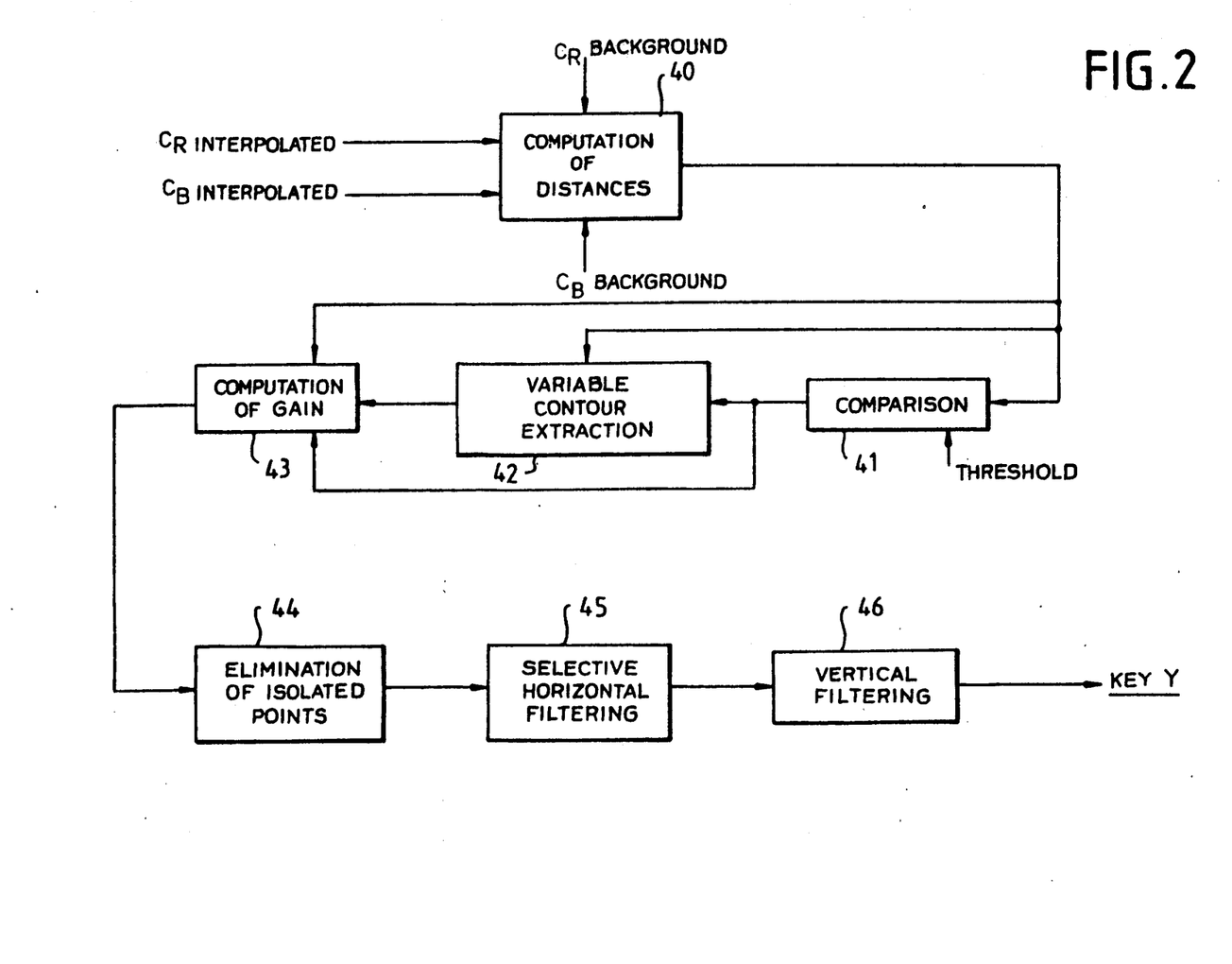

FIG. 2 is a block diagram of a device for obtaining the dividing key signal according to the invention. A dividing key signal allowing the processing of the luminance Y, is obtained from the colour difference signals $C_R$ and $C_B$. Now, as the colour difference signals $C_R$, $C_B$ are sampled at a frequency which is half that of the luminance signal Y, only one item of information in every two items can be used. In order to double the number of samples, an interpolation device 3 computes the missing samples $C_{Ri}$, $C_{Bi}$ (odd indices), for example, using a digital filtering formula dependent on the interpolating filter used. The interpolated signals $C_R$, $C_B$ are then used in the dividing key computing device 4. Firstly a distance DIST between the colour of the point in question and the characteristic colour of the background is computed in the distance computing device 40, for each pixel of the image, such that:

$$DIST = [(C_R - C_R background)^2 + (C_B - C_B background)^2]^{\frac{1}{2}}.$$

The background parameters $C_R$ background and $C_B$ background, are automatically acquired or supplied by the user. For this purpose, the user enters a rectangular window on the coloured background considered as representative of the latter. The values $C_R$ background and $C_B$ background are then obtained by taking the average of the values $C_R$ and $C_B$ for all of the points belonging to the entered window. The more the window is extended, the less the average value is sensitive to background noise and the better is its characterisation of the latter. The background/subject differentiation is produced, for example, by characterising the background with a circle of centre ($C_R$ background, $C_B$ background), and of radius R threshold in the plane ($C_R$, $C_B$). The points inside this circle are considered as belonging to the background, the others to the subject.

For each point, the values of ($C_R - C_R$ background) and ($C_B - C_B$ background) are squared and summed and then the square root is extracted in order to obtain the Euclidean distance DIST between the colour of any point in the source image and the background colour, in the chromatic plane ($C_R$, $C_B$). The distance signal DIST is then compared, in a comparison device 41, with a threshold distance value corresponding to the points of radius R threshold in order to obtain a binary dividing key of the subject. The points whose distance is less than this threshold are considered as belonging to the background (key=0), the others as belonging to the subject. The adjustment of the value of the threshold allows the optimisation of the background/subject differentiation. When the comparison of the Euclidean distance between the subject and the background with the threshold value has been carried out, the dividing key obtained is a binary key. The use of this key for switching the subject to be inlaid would give rise, as has already been said, to jagged and bluish contours, hence the necessity of introducing a gain function in the dividing key. The type of the transition is defined by the detected width of the contour: a narrow contour corresponds to a sharp transition, a wide contour to a slow transition. All of the points belonging to a background/subject transition are considered as contour points. Contrary to the prior art, the gain is applied only to the background/subject transitions of the source image and in a way which is variable depending on the width of the contours, in order to retain the same type of transition in the inlaid image, to eliminate the blue fringes and the impression of jagged contours It is therefore necessary to detect the background/subject transitions and to characterise their type.

Figure 3:
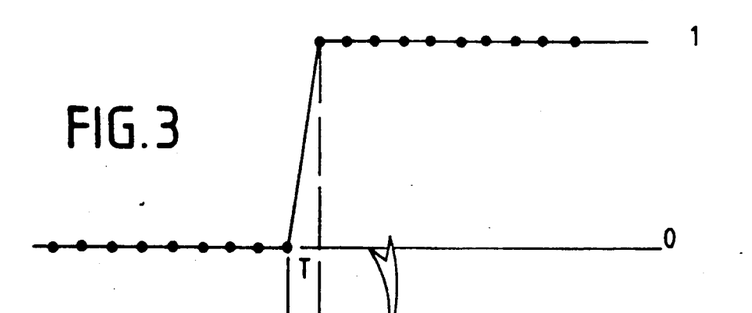

The extraction of a contour of variable width by an extraction device 42, is carried out on each image line on the basis of a binary dividing key signal such as that shown in FIG. 3 for example. The binary dividing key signal allows the detecting of background/subject transitions or subject/background transitions. For each image line, when a transition T is detected, the points located on either side of the transition T are studied in order to determine the width of the transition. For this purpose a monitoring of the graph of the distances is carried out point by point in the vicinity of the transition T.

Figure 4:
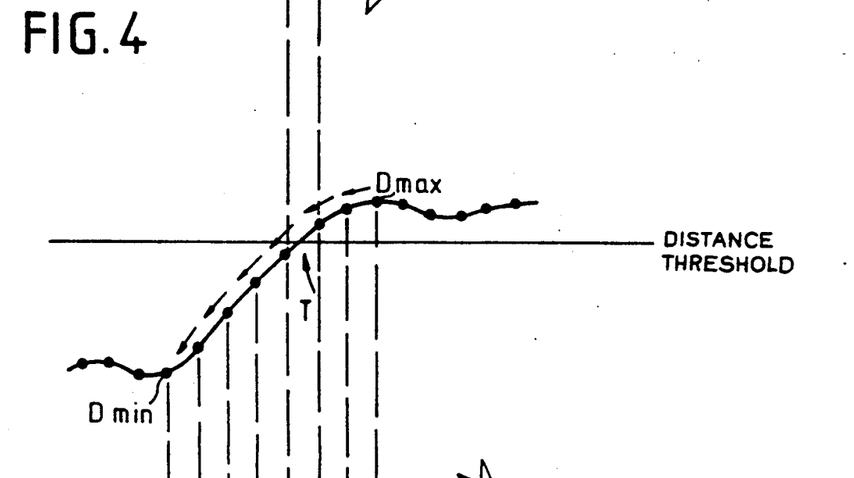

FIG. 4 shows an example of a graph of distances for points located in the vicinity of a transition T. For a background/subject transition, as long as the distance value of a point located after (and before respectively) the transition T increases (and decreases respectively) sufficiently (for example 4 standardised units) with respect to the distance value of the preceding point (or following point respectively), this point is considered as a contour point. For a subject/background transition, the width of the transition is determined in the same way but with a decrease in the distance value after the transition and an increase before the transition. The image of the contour points is obtained when all of the lines of the image have been travelled.

Figure 5:
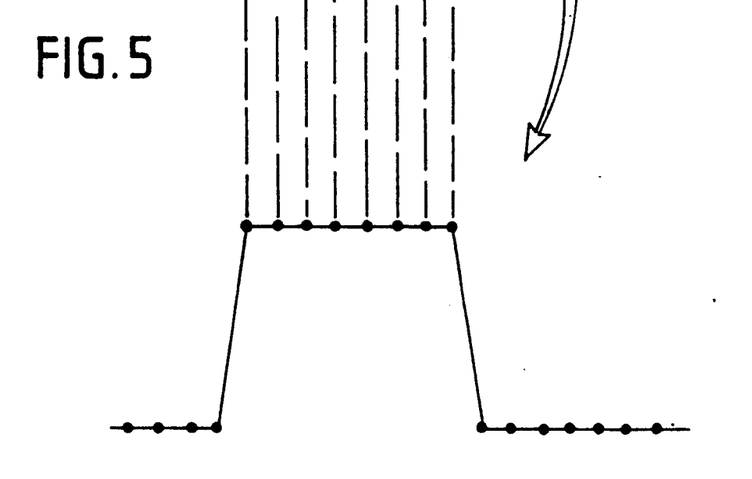

FIG. 5 shows an example of a contour of variable width for which the value 1 has been allocated to points belonging to the contour and the value 0 to points not belonging to the contour. A maximum width of the contour can be adjusted by the user, in order to limit the width of the transitions and to voluntarily sharpen them (for example 20 points).

Figure 6:
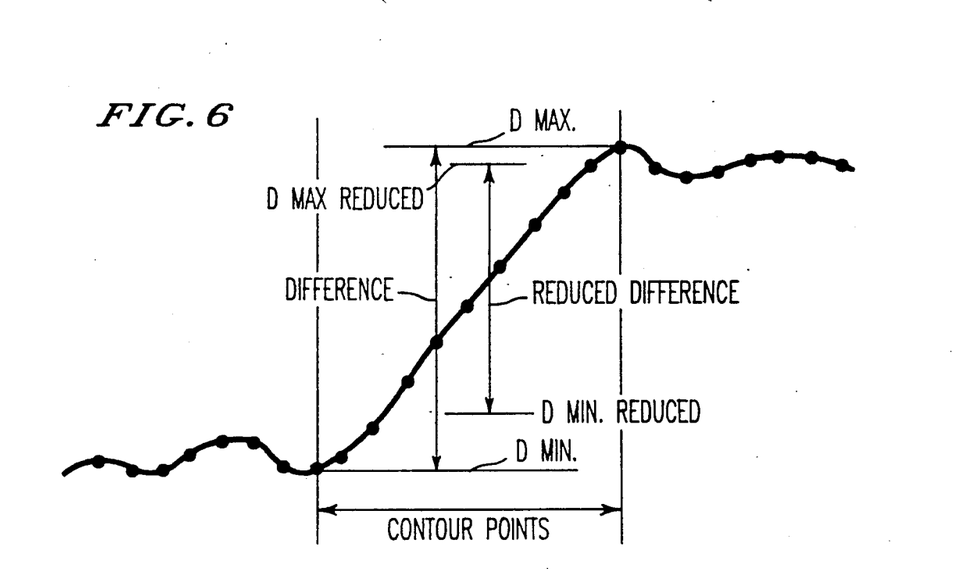

The computation of the gain by a computing device 43 is then carried out for each point belonging to a transition as a function of its distance value, the other points retaining their value defined by the binary key. For this purpose, for each line of the image, and for each transition, the minimum Dmin and maximum Dmax distances corresponding to the start and end of a transition are determined. The difference, Dmax−Dmin, between these minimum and maximum distances is computed and reduced in order not to consider the distance values due to oscillations on either side of the transition introduced during the interpolating filtering.

The reduction in the difference, Dmax−Dmin, is carried out for example as follows:

$Dmin\ reduced = Dmin + 20\% \ (Dmax - Dmin)$ $Dmax\ reduced = Dmax - 5\% \ (Dmax - Dmin)$ The restriction of the interval is not symmetrical, because if all of the precautions taken on Dmin in order to avoid the oscillations do not give rise to problems at the level of the inlaid image (a too fast passage to the background level) the same precautions on Dmax risk causing the retention of a section around the subject which can sometimes be large and thus generate a blue fringe on the inlaid image. In this case, it is preferable to retain certain oscillations rather than to introduce a blue edge around the subject. The gain is therefore calculated on the contour points whose distance is included between the new values Dmin reduced and Dmax reduced, and this is carried out in a way which is proportional to the distance value of the point in question, in order to reproduce an identical transition in the inlaid image.

Figure 7:
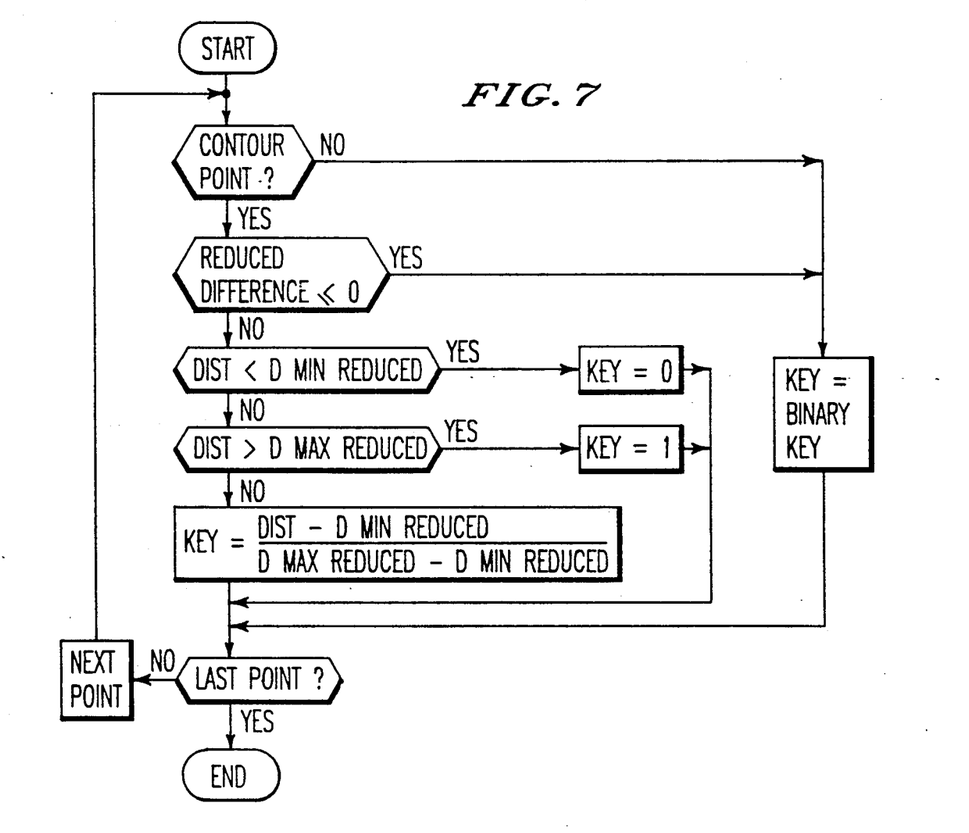

FIG. 7 shows an example of a flowchart allowing the computation of a dividing key with gain proportional to the distance value of the point in question. For a contour point, such that the reduced difference, Dmax reduced−Dmin reduced, is less than or equal to 0, the dividing key is the binary key. If the reduced difference is greater than 0 and the distance value of the point in question is included between Dmin reduced and Dmax reduced, the dividing key is obtained from the following formula:

$key = (DIST - Dmin\ reduced)/(Dmax\ reduced - Dmin\ reduced)$

If the difference is greater than 0 and the distance value of the point in question is less than Dmin reduced (or greater than Dmax reduced respectively), the value of the dividing key is equal to 0 (or equal to 1 respectively).

A dividing key thus obtained allows the inlaying of the source image on the new background, but necessitates specific processings before being able to be used in a satisfactory manner. The first specific processing relates to the elimination by a device 44 of isolated points remaining in the key, that is to say any point whose dividing key value is totally different from that of the adjacent points. Any point vertically or horizontally framed by two points having a key value 0 (or 1 respectively) will have its key value set to 0 (or 1 respectively). The elimination of these aberrant points, generally due to the coloured background of the source image, allows them to be ignored in the choice of the optimum threshold value, insofar as they are not reproduced on two consecutive lines.

After elimination of isolated points, the dividing key is subjected to a selective horizontal filtering 45. In fact, when a contour is practically horizontal, the points belonging to this contour are not detected as the extraction of the contour is carried out line by line and only the vertical or oblique transitions are sought. The selective horizontal filtering allows detection of these horizontal transitions in the dividing key and allows them to be artificially softened, in order to avoid them appearing as a broken line in the inlaid image.

Finally, the dividing key having been obtained by line by line processing, off-sets between two consecutive lines can appear giving rise to a significant flickering of the inlaid image on the horizontal transitions. It therefore appears necessary to carry out a vertical filtering 46 on the dividing key in order to re-correlate the various lines with each other. For example, a filter giving a vertical average over three points gives good results.

The dividing key signal with gain obtained at the end of this processing can be used directly for the luminance inlaying. A similar key is computed for the inlaying of colour difference signals, necessitating a signal sampled at a frequency which is half that of the luminance signal. The dividing key Y is therefore passed through a low pass sub-sampling filter in order to obtain a dividing key $C_R/C_B$.

The two dividing Y key and $C_R/C_B$ key signals being available, the mixing between the source video and the background video can be carried out. Even though constituting two separate entities, because of the frequency difference, the luminance and colour difference inlays are carried out in the same manner. Accordingly, the following description is given with reference to the luminance signals but can be directly applied to the colour difference signals.

A conventional linear mixing has a certain number disadvantages. In a conventional linear mixing, the value of an inlaid point depends on the value of the corresponding source point and on the level of the dividing signal according to the formula:

$$Yinl(p) = key(p) * Ys(p) + (1 - key(p)) * Ynbackground(p)$$

where Yinl(p), Ys(p) and Ynbackground(p) respectively represent the after-inlaying, source and new background values respectively of a point p of the image.

This type of mixing causes the appearance on the transitions of a lowering or an excess of luminance inherent in the values of Ys(p) and Ynbackground(p) on the transition.

Thus, the values Ys(p) contain, for most of the transition points, a luminance section of the blue (or other) of the background which is therefore reinjected in the inlaid image, causing a bright or dark fringe on the contour of the subject. The same disadvantage on the colour difference components $C_R$, $C_B$ can give rise to a colouring of this fringe. The improvement provided consists in fixing Ys(p) and Ynbackground (p) at constant values on the transition, effectively representing luminance values of the subject and of the new background.

The pseudo-linear mixing is therefore carried out according to the formula:

$$Y\,inl(p) = key\,(p) * VALSOURCE + (1 - key\,(p)) * VALBACKGROUND$$

The values VALSOURCE and VALBACKGROUND are determined on each transition. In the case of a background/subject transition, VALBACKGROUND is the value of Ybackground at the last point before transition whose dividing key value is 0, VALSOURCE is the value of Ys at the point whose dividing key value is a maximum on the transition. The reverse reasoning is applied in the case of a subject/background transition.

The improvements provided, on the one hand by a control of the transition on a contour of variable width of the subject and, on the other hand, by a pseudo-linear mixing, allows the obtaining of an inlaid image which is practically perfect at the level of the subject/new background to transitions. However, neither the transparency effects nor the fine details, nor the shadows are reproduced in it. It is necessary to inject them into the inlaid image in order to obtain the final inlaid image 9.

It should be noted that the fine details, transparency and shadows are processed in the same manner. The only reservation to be made is the fact that the adjustments can be different in the case of elements which are lighter than the former background or in the case of elements which are darker than the former background. In the rest of the description, the term "details" denotes both the transparency effect (fog, glass, smoke), shadows, and fine details.

The first processing relating to the details consists in the detection of the latter.

Figure 8:
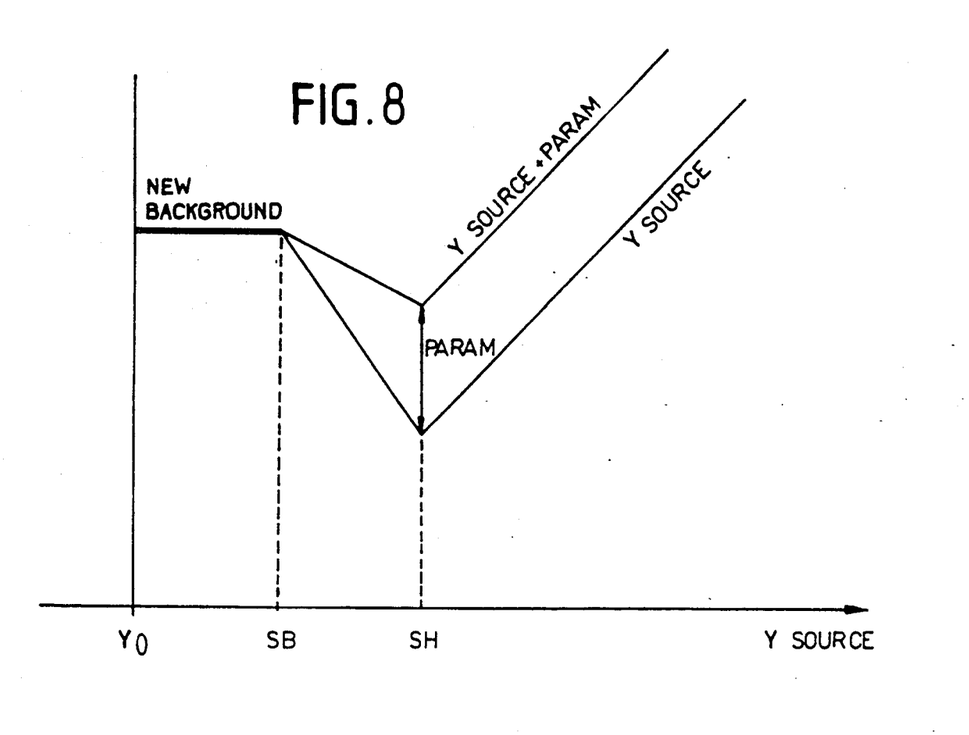

FIG. 8 shows an example of inlaying luminance details according to the invention.

For the luminance component of the source image, the value $Ys(p)-Y_0$ is computed at each point of the image where the dividing key is different from 1 (transitions background). The parameter $Y_0$ represents the average value of the luminance over the background, and is computed by determining the average of the luminance levels over the window entered by the user during the determination of $C_R$ background and $C_B$ background. In the case of details which are lighter than the background, the value $Ys(p) - Y_0$ is considered such that, in the case of darker details, it is necessary to take its absolute value.

In what follows, in order to simplify it, the absolute values have been voluntarily ignored and only the light details are therefore considered.

However, the reasoning used is strictly identical for the dark details, replacing $(Ys(p) - Y_0)$ with $|Ys(p) - Y_0|$.

If $Ys(p) - Y_0$ is less than a low threshold SB fixed by the user, the corresponding point is considered as not being a detail.

If $Ys(p) - Y_0$ is greater than a high threshold SH to be determined by the user, the corresponding point is considered as being an integral part of a detail. Between the two thresholds SH, SB, the corresponding point is "more or less" a detail according to the value of $Ys(p) - Y_0$. In other words, the equations allowing the inlaying of light luminance details are as follows:

(a). if $Ys(p) - Y_0 < SB$, Yinl(p) unchanged.
(b). if $Ys(p) - Y_0 > SH$, $Yinl(p) = Ys(p) + param$
(c). if $SB < Ys(p) - Y_0 < SH$ $$Yinl(p) = [Ynbackground(p) - Y_0 - SH - param) * (Ys(p) - Y_0) + SB(Y_0 + SH + param) - Ynbackground(p) * SH]/(SB - SH).$$

The parameter param allows the adjustment of the luminance level of the details with respect to the luminance level of the source image.

Between the high threshold SH and the low threshold SB, the details are re-inlaid in proportion to the value of $Ys(p) - Y_0$. The coefficients of the equation (c) have been computed such that (a) and (c) provide an identical value of Yinl(p) in the limit condition Ys(p-

)−Y0=SB, and similarly for (b) and (c) in the case where Ys(p)−Y0=SH.

The luminance inlaying of details therefore necessitates the adjustment of three parameters: SB, SH, param.

The low threshold SB allows the adjustment of the level from which a point is a detail. If SB=0 all of the non-uniformities of the former coloured background are re-transposed into the inlaid image. The adjustment of the low threshold SB therefore allows a compromise between the pollution of the new background by the noise of the former background and the correct reproduction of hardly visible details.

The high threshold SH, or more exactly the difference between the high threshold SH and the threshold SB, allows the definition of the zone of proportionality of reproduction of details and therefore of the slope of the "straight line" of proportionality (a straight line in the case of a zone of homogeneous new background). The smaller the slope of the "straight line" becomes (difference SH−SB high) the smaller the proportion of re-transcribed details becomes and vice-versa. It should be noted that the slope of the "straight line" does not only depend on the difference between the high threshold SH and the low threshold SB but also on the difference between the luminance of the new background and the luminance of the source image. As a general rule, the higher the difference in luminance between the new background and the source image, the greater the difference between the high threshold SH and the low threshold SB must be in order to obtain a correct result.

Finally, the "param" parameter allows an increase or reduction in the luminance of the details with respect to that of the source image. In most cases, param is set to zero (the default value), particularly in the frequent case in which the details touch the subject. A non-zero value of param would then cause an offset between the luminance of the subject and the luminance of the details, generating a discontinuity in the inlaid image.

Figure 9:
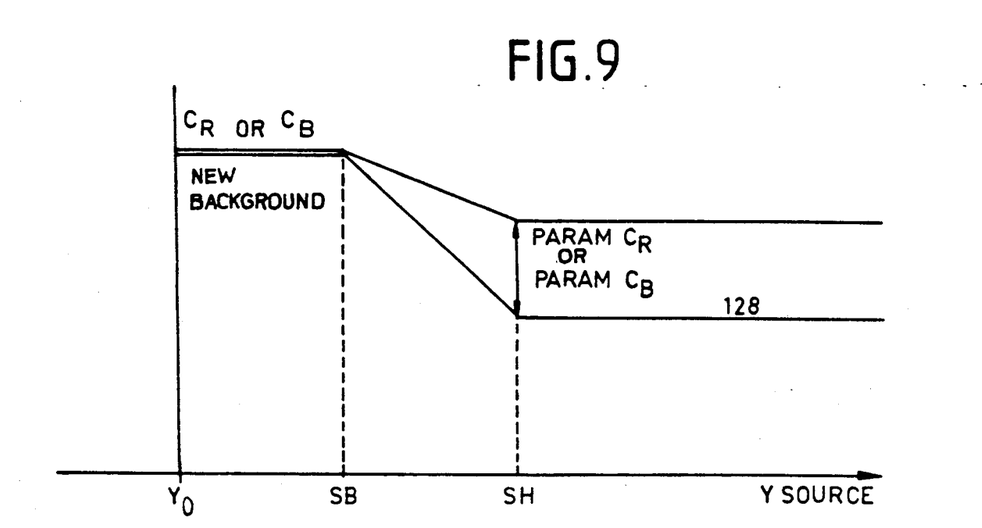

FIG. 9 shows an example of the inlaying of details, as a colour difference, according to the invention.

The inlaying of colour difference signals is carried out according to the same principle except that above the high threshold SH the colour of the re-transcribed details is not the original one but a grey level ($C_R=128$, $C_B=128$), and that the zone of proportionality of the new background is desaturated.

Thus
if Ys(p)−Y0<SB, $C_R$inl(p) is unchanged
if Ys(p)−Y0>SH, $C_R$inl(p)=128+param $C_R$
if SB<Ys(p)−Y0<SH $C_R$inl(p)=[($C_R$nbackground(p)−128−param $C_R$)*(Ys(p)−Y0)+SB(128+param $C_R$)−$C_R$nbackground(p)*SH]/(SB−SH)

The same relationships are applied for $C_B$inl(p), replacing $C_R$ with $C_B$, SB and SH being identical.

The values of the low threshold SB and the high threshold SH are fixed by default at the same values as those used for the inlaying in luminance but can if desired be changed by the user. Similarly param $C_R$ and param $C_B$ are fixed by default to the value of param (generally 0), but can also be changed independently from each other in order to colour the details of the inlaid image.

The method according to the invention allows the obtaining of satisfactory inlaid images necessitating very few adjustments in the great majority of cases: only one threshold adjustment for an image without details, three adjustments (threshold; SH; SB) for an image with details which are lighter or darker than the background, five adjustments (threshold; SH, SB light details; SH, SB dark details) for an image with light and dark details, while all of the other parameters defined above such as $C_R$background, $C_B$background, $Y_0$, width of the window representative of the background, threshold distance, can generally assume the values fixed by default without degrading the quality of the inlaying.

The present invention is not limited to the examples precisely described and shown.

Various modifications can be applied to it without departing from the scope of the invention. In particular, the characterisation of the background by a circle can be with an elliptical characterisation. The distance value DIST from a point of the source image to be background would then be written:

$$DIST=[k(C_R-C_Rbackground)^2+k_0(C_B-C_Bbackground)^2]^{\frac{1}{2}}$$

where k is different from $k_0$. It is also possible to change the axes of the ellipse or again to define any closed area characterising the background in the chromatic plane ($C_R$, $C_B$).

Similarly, the detection of contours line by line allows only the detection of background/subject transitions which are vertical or at least treated as such, but it is possible to carry out a contour detection allowing the defining of the direction of the transitions and to work on the latter perpendicularly to the determined direction.

We claim:

1. A method for inlaying color video images, including the generation of a switching signal, or dividing key signal, to which a gain is applied in order to extract from a source image a subject placed in front of an original background of uniform color, and carrying out a mixing of the subject with a new background image, comprising the steps of:
    detecting background/subject and subject/background transitions dynamically in the source image according to distance values between points of the subject and points of the background,
    defining a contour of the subject as an outer perimeter edge region around the subject and having a variable width depending upon determined characteristics of the detected transition, said width being calculated, at each transition, from the evolution of the distance values of localized points around the transition, and
    applying the gain only to selected points of the source image belonging to the contour of the subject, and in proportion to the distance value between said selected points and points of said original background.

2. The method according to claim 1, wherein the mixing is performed at each point of the subject and is such that the mixing is a function of the values of the dividing key signal at said selected points, and the dividing key signal values of the points of the source image and the points of the new background ar fixed constants over the width of the contour.

3. The method according to claim 1, wherein the width of the contour of the subject is determined in each image line by detecting the subject/background or background/subject transitions, by comparison, for each point of the source image, of its distance value with a threshold value and by passing through, for each transition, the points located on either side of the transition until a minimum distance or maximum distance value is obtained corresponding to the start or end of the transition and delimiting the width of the contour for each said transition.

4. The method according to claim 3, wherein the width of the contour corresponding to a transition is reduced in order to avoid oscillations on either side of the contour.

5. The method according to any one of the preceding claims, wherein the width of the contours is limited to a maximum value by a user.

6. The method according to claim 1, wherein isolated points having key signal values which are significantly different from key signal values of adjacent points are detected and eliminated.

7. The method according to claim 1, wherein horizontal transitions are detected and smoothed.

8. The method according to claim 1, wherein a vertical filtering is carried on the dividing key signal.

9. The method according to claim 1, wherein points of the source image corresponding to details, shadows and transparencies are detected by comparing a luminance difference between the subject and the original background with two threshold values consisting of a high threshold value and a low threshold value, and wherein linear mixing between the subject and the new background is carried out according to the value of said luminance difference when said luminance difference is included between the two threshold values.

10. A device for inlaying of color video images, including the generation of a switching signal, or dividing key signal, to which a gain is applied in order to extract from a source image a subject placed in front of an original background of uniform color, and including mixing of the subject with a new background image, comprising:

interpolating means for interpolation of color difference signals;

computing means for computing a luminance dividing key in accordance with said color difference signals;

low pass filter means for performing low pass filtering having an input for receiving the luminance dividing key signal and an output for supplying a dividing key signal which allows the inlaying of the color deference signals;

means for inlaying the color difference signal shaving an input for receiving the color difference signals, source and background signals, an the dividing key signal;

means for inlaying a luminance signal having an input for receiving source and background luminance signals and the dividing key signal; and means for inlaying details, shadows and transparencies, having an input for receiving the luminance signals and color difference signals of the source signal and of the video signal after inlaying as well as the dividing key signal, wherein a final inlayed image is obtained.

11. A device according to claim 10, wherein the means for computing the dividing key further comprises, in series, means for computing distances;

means for comparing said distances with a threshold;

means for extracting a contour of variable width;

means for computing a gain for points belonging to a contour;

means for eliminating isolated points;

means for performing selective horizontal filtering; and means for performing vertical filtering.

* * * * *